US007056597B2

(12) United States Patent
Wittebrood et al.

(10) Patent No.: US 7,056,597 B2
(45) Date of Patent: *Jun. 6, 2006

(54) BRAZING SHEET PRODUCT AND METHOD OF ITS MANUFACTURE

(75) Inventors: Adrianus Jacobus Wittebrood, Velserbroek (NL); Jacques Hubert Olga Joseph Wijenberg, Amsterdam (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 224 days.

This patent is subject to a terminal disclaimer.

(21) Appl. No.: 10/732,405

(22) Filed: Dec. 11, 2003

(65) Prior Publication Data
US 2004/0121180 A1   Jun. 24, 2004

Related U.S. Application Data

(63) Continuation-in-part of application No. 10/621,601, filed on Jul. 18, 2003, now Pat. No. 6,994,919.

(60) Provisional application No. 60/443,867, filed on Jan. 31, 2003.

(30) Foreign Application Priority Data
Dec. 13, 2002   (EP) .................. 02027898

(51) Int. Cl.
B32B 15/20   (2006.01)
B23K 35/28   (2006.01)
F28F 21/08   (2006.01)
(52) U.S. Cl. .................. 428/653; 428/654; 228/262.51; 228/209; 165/905
(58) Field of Classification Search .......... 428/653; 148/530
See application file for complete search history.

(56) References Cited

U.S. PATENT DOCUMENTS

| 2,745,799 | A | 5/1956 | Patrie |
| 2,821,014 | A | 1/1958 | Miller |
| 2,821,505 | A | 1/1958 | Beach |
| 3,482,305 | A | 12/1969 | Dockus et al. |
| 3,489,657 | A | 1/1970 | Brenan et al. |
| 3,597,658 | A | 8/1971 | Rivera |
| 3,692,583 | A | 9/1972 | Mucenieks et al. |
| 3,862,018 | A | 1/1975 | Mentone |
| 3,881,999 | A | 5/1975 | Toth et al. |
| 3,896,009 | A | 7/1975 | Kobayashi et al. |
| 3,963,454 | A | 6/1976 | Singleton, Jr. |
| 3,970,237 | A | 7/1976 | Dockus |
| 4,028,200 | A | 6/1977 | Dockus |
| 4,039,298 | A | 8/1977 | Anthony et al. |
| 4,097,342 | A | 6/1978 | Cooke et al. |
| 4,098,957 | A | 7/1978 | Vernam et al. |
| 4,126,522 | A | 11/1978 | Edlund |
| 4,157,154 | A | 6/1979 | Scott et al. |
| 4,164,454 | A | 8/1979 | Schober |
| 4,177,325 | A | 12/1979 | Roberts et al. |
| 4,346,128 | A | 8/1982 | Loch |
| 4,388,159 | A | 6/1983 | Dockus et al. |
| 4,397,721 | A | 8/1983 | Exalto et al. |
| 4,602,731 | A | 7/1986 | Dockus |
| 4,721,653 | A | 1/1988 | Oda et al. |
| 4,741,811 | A | 5/1988 | Lefebvre et al. |
| 5,069,980 | A | 12/1991 | Namba et al. |
| 5,234,574 | A | 8/1993 | Tsuji et al. |
| 5,245,847 | A | 9/1993 | Bando et al. |
| 5,246,565 | A | 9/1993 | Mignardot |
| 5,422,191 | A | 6/1995 | Childree |
| 5,466,360 | A | 11/1995 | Ehrsam et al. |
| 5,601,695 | A | 2/1997 | Muranushi |
| 5,643,434 | A | 7/1997 | Benmalek et al. |
| 5,961,853 | A | 10/1999 | Thornton |
| 5,997,721 | A | 12/1999 | Limbach et al. |
| 6,060,174 | A | 5/2000 | Sabol et al. |
| 6,129,262 | A | 10/2000 | Cooper et al. |
| 6,165,630 | A | 12/2000 | Gehlhaar et al. |
| 6,379,818 | B1 | 4/2002 | Mooij et al. |
| 6,383,661 | B1 | 5/2002 | Wittebrood et al. |
| 6,391,476 | B1 | 5/2002 | Wittebrood et al. |
| 6,503,640 | B1 | 1/2003 | Wittebrood et al. |
| 6,568,584 | B1 | 5/2003 | Wittebrood et al. |

(Continued)

FOREIGN PATENT DOCUMENTS

CH      655134    12/1983

(Continued)

OTHER PUBLICATIONS

ASTM G-85 (1990), no month given.

(Continued)

Primary Examiner—John J. Zimmerman
(74) Attorney, Agent, or Firm—Stevens, Davis, Miller Mosher LLP

(57) ABSTRACT

Disclosed is a brazing sheet product comprising a core metal sheet, on at least one side of the core sheet a clad layer of an aluminium brazing alloy comprising silicon in an amount in the range of 4 to 14% by weight, and further comprising on at least one outersurface of the clad layer a coated layer of iron-X alloy, wherein X is selected from one or more members of the group consisting of tin, zinc, manganese, and copper, and such that the clad layer and all layers exterior thereto form a metal filler for a brazing operation and having a composition with the proviso that the mol-ratio of Fe:X is in the range of 10:(0.3 to 6). The invention also relates to a method of manufacturing such a brazing product, and to a brazed assembly comprising at least one component made of this brazing product.

56 Claims, No Drawings

U.S. PATENT DOCUMENTS

| | | | |
|---|---|---|---|
| 6,599,645 B1 | 7/2003 | Wittebrood | |
| 6,913,184 B1 * | 7/2005 | Dockus et al. | 228/56.3 |
| 6,959,853 B1 * | 11/2005 | Graham et al. | 228/123.1 |
| 7,000,823 B1 * | 2/2006 | Dockus et al. | 228/262.51 |
| 2002/0088717 A1 | 7/2002 | Wittebrood et al. | |
| 2002/0175205 A1 | 11/2002 | Wittebrood et al. | |
| 2003/0042146 A1 | 3/2003 | Wijenberg et al. | |
| 2003/0064242 A1 | 4/2003 | Wittebrood et al. | |
| 2003/0091856 A1 | 5/2003 | Wittebrood et al. | |
| 2003/0098338 A1 | 5/2003 | Dockus et al. | |
| 2003/0155409 A1 | 8/2003 | Dockus et al. | |
| 2003/0189082 A1 | 10/2003 | Dockus et al. | |
| 2003/0197050 A1 | 10/2003 | Graham et al. | |

FOREIGN PATENT DOCUMENTS

| | | |
|---|---|---|
| DE | 3821073 | 1/1989 |
| EP | 0227261 | 7/1987 |
| EP | 795048 | 6/1996 |
| FR | 2354171 | 1/1978 |
| FR | 2617868 | 1/1989 |
| GB | 1176688 | 1/1970 |
| GB | 2000525 | 1/1979 |
| JP | 54013430 | 1/1979 |
| JP | 3285763 | 12/1991 |
| JP | 5106059 | 4/1993 |
| JP | 9310137 | 3/1998 |
| JP | 11097298 | 4/1999 |
| JP | 2000297338 | 10/2000 |
| WO | 9743467 | 11/1997 |
| WO | 0071781 | 11/2000 |
| WO | 0071784 | 11/2000 |
| WO | 0168312 | 9/2001 |
| WO | 0188226 | 11/2001 |
| WO | 0238326 | 5/2002 |
| WO | 02060639 | 8/2002 |
| WO | 02086197 | 10/2002 |
| WO | 03043777 | 5/2003 |
| WO | 03045618 | 6/2003 |
| WO | 03045619 | 6/2003 |

OTHER PUBLICATIONS

Wijenberg et al., filed Jul. 18, 2003, U.S. Appl. No. 10/621,601 (unpublished).

Wijenberg et al., filed Jul. 18, 2003, U.S. Appl. No. 10/622,122 (unpublished).

Bureau of Mines Technology, "Aluminium Soft-Soldering", 2301 N.T.I.S. Tech Notes (manufacturing), XP-002119816, 1985, Jan. No. 1G, Springfield, VA, pp. 12-13.

Wernick and Pinner, "The Surface Treatment and Finishing of Aluminium and Its Alloys", 5th edition, vol. 1, pp. 181-182 and pp. 191-203 (1988), no month given.

Wernick and Pinner, "The Surface Treatment and Finishing of Aluminium and its Alloys", 5th edition, vol. 2, pp. 1006-1022 and pp. 1023-1071 (Ch. 14-15)(Nov. 1988).

SAE Paper No. 880446 by B.E. Cheadle and K.F. Dockus, "Inert Atmosphere Fluxless Brazing of Aluminum Heat Exchangers", ICE, Detroit, Michigan, pp. 1-11 (Feb. 29-Mar. 4, 1988).

Adrianus Jacobus Wittebrood, Jacques Hubert Olga Joseph Wijenberg, Joop Nicolaas Mooij, "Nickel-Plated Aluminum Brazing Sheet" Research Disclosure, No. 439, pp. 1946-1947 (Nov. 2000).

SAE Paper No. P-263 by Kent Schölin and Bo Mannerskog, "Corrosion Resistant Aluminium Radiator Materials for Vacuum and Controlled Atmosphere Brazing" pp. 75-82, 1993 Vehicle Thermal Management Systems Conference Proceedings, no month given.

Greef, N. et al, "The Hydrogen Evolution Reaction", Instrumental Methods in Electrochemistry, pp. 233-236 (1990), no month given.

U.S. Appl. No. 10/732,448, Wittebrood et al., filed Dec. 11, 2003 (unpublished).

Patent Abstracts of Japan, vol. 2000, No. 13 (Feb. 5, 2001).

Patent Abstracts of Japan, vol. 1998, No. 04, (Mar. 31, 1998).

Patent Abstracts of Japan, vol. 0161, No. 19 (M-1225)(Mar. 25, 1992).

Office action mailed Jun. 7, 2005 from copending U.S. Appl. No. 10/732,448.

* cited by examiner

BRAZING SHEET PRODUCT AND METHOD OF ITS MANUFACTURE

This application claims priority under 35 USC 119 from U.S. provisional patent application No. 60/443,867 filed Jan. 31, 2003, incorporated herein by reference in its entirety, and European patent application Serial No. EP 02027898.2 filed Dec. 13, 2002, incorporated herein by reference in its entirety. Also, this application is a continuation-in-part of U.S. patent application Ser. No. 10/621,601, filed Jul. 18, 2003, now U.S. Pat. No. 6,994,919.

FIELD OF THE INVENTION

The invention relates to a brazing sheet product, comprising a metallic core having on at least one side of the core an aluminium clad layer being made of an aluminium alloy comprising silicon in an amount in the range of 4 to 14% by weight, and a further metal layer, wherein taken together the aluminium clad layer and all layers exterior thereto form a filler metal for a brazing operation. The invention also relates to a method of manufacturing such a brazing product, and to a brazed assembly comprising at least one component made of this brazing product.

DESCRIPTION OF THE RELATED ART

Metals, such as aluminium and aluminium alloys, can be joined by a wide variety of brazing and soldering processes. Brazing, by definition, employs a filler metal or alloy having a liquidus above 450° C. and below the solidus of the base metal. Brazing is distinguished from soldering by the melting point of the filler metal: a solder melts below 450° C. Soldering processes are not within the field of the present invention.

Brazing sheet products find wide applications in heat exchangers and other similar equipment. Conventional aluminium brazing sheet products have a core or base sheet, typically an aluminium alloy of the Aluminium Association ("AA")3xxx-series, having on at least one surface of the core sheet clad an aluminium clad layer, the aluminium clad layer being made of an AA4xxx-series alloy comprising silicon in an amount in the range of 4 to 14% by weight, and preferably in the range of 7 to 14% by weight. The aluminium clad layer may be coupled to the core or base alloy in various ways known in the art, for example by means of roll bonding, cladding, explosive cladding, thermal spray-forming or semi-continuous or continuous casting processes.

Controlled Atmosphere Brazing ("CAB") and Vacuum Brazing ("VB") are the two main processes used for industrial scale aluminium brazing. Industrial vacuum brazing has been used since the 1950's, while CAB became popular in the early 1980's after the introduction of the NOCOLOK (trade mark) brazing flux. Vacuum brazing is an essentially discontinuous process and puts high demands on material cleanliness. The disruption of the aluminium oxide layer present is mainly caused by the evaporation of magnesium from the clad alloy. The capital investment for suitable equipment is relatively high.

CAB requires an additional process step prior to brazing as compared to VB, since a brazing flux has to be applied prior to brazing. A brazing flux material for use in brazing aluminium alloys usually consists of mixtures of alkali earth chlorides and fluorides, sometimes containing aluminium fluoride or cryolite. CAB is essentially a continuous process in which, if the proper brazing flux is being used, high volumes of brazed assemblies can be manufactured. The brazing flux dissolves the oxide layer at brazing temperature allowing the clad alloy to flow properly. When the NOCOLOK flux material is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminium surface before brazing. The brazing flux material after drying, however, can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the known brazing flux application. Such a material can be supplied to a manufacturer of brazed assemblies and is ready to use directly after forming of the assembly parts. No additional brazing fluxing operations have to be carried out. Presently, only one process for fluxless brazing is used on an industrial scale. The material for this process can be for example standard brazing sheet made from an AA3xxx-series core alloy clad on one or both sides with a cladding of an AA4xxx-series alloy. Before the brazing sheet can be used the surface has to be modified in such a way that the naturally occurring aluminium oxide layer does not interfere during the brazing cycle. The method of achieving good brazing is to deposit a specific amount of nickel on the surface of the clad alloy. If properly applied, the nickel reacts, presumably exothermically, with the underlying aluminium.

Processes for nickel-plating in an alkaline solution of aluminium brazing sheet are known from each of U.S. Pat. No. 3,970,237, U.S. Pat. No. 4,028,200, and U.S. Pat. No. 4,164,454. According to these documents, nickel or cobalt, or combinations thereof, are deposited in combination with lead. The lead addition is used to improve the wetteability of the aluminium clad alloy during the brazing cycle. An important characteristic of these plating processes is that the nickel is preferentially deposited on the silicon particles of the aluminium clad alloy. To obtain sufficient nickel for brazing, the surface of the aluminium clad alloy should contain a relatively large number of silicon particles to act as nuclei for the nickel deposition. It is believed that to obtain sufficient nucleation sites a part of the aluminium in which the silicon particles are embedded should be removed before pickling by chemical and/or mechanical pre-treatment. This is believed a necessary condition to obtain sufficient silicon coverage to serve as nuclei for the plating action of the brazing or clad alloy. On a microscopic scale the surface of the Si-containing cladding of the brazing sheet is covered with nickel-lead globules. However, the use of lead for the production of a suitable nickel and/or cobalt layer on brazing sheet has several disadvantages. The use of lead for manufacturing products, such as automotive products, is undesirable and it is envisaged that in the very near future there might possibly even be a ban on lead comprising products or products manufactured via one or more intermediate processing steps comprising lead or lead-based components.

The international application no. WO-00/71784, by J. N. Mooij et al. (corresponding to U.S. Pat. No. 6,379,818 incorporated herein by reference in its entirety) discloses a brazing sheet product in which there is provided a very thin bonding layer, preferably applied by plating, comprising zinc or tin between the AlSi-alloy clad layer and the nickel layer in order to improve the bonding of the applied nickel layer. The addition of lead to the nickel layer has been replaced by the addition of bismuth while maintaining the excellent brazeability characteristics of the brazing sheet product.

A drawback of the known brazing sheet products having a layer comprising nickel is the limited corrosion life of brazed products in a SWAAT-test in accordance with ASTM G-85. Corrosion lifetimes without perforations are typically in the range of 4 to 6 days when having an AA3003-series core alloy and thereby restricting possible interesting applications of the brazing sheet product. For several applications, however, of the known nickel-plated brazing sheet in brazed products such a relatively short corrosion lifetime is not detrimental. A good corrosion resistance is considered a valuable property for brazing products used in amongst others heat exchangers, such as radiators and condensers. According to the international application WO-02/060639, by A. J. Wittebrood et al., the corrosion performance of Ni-plated brazing sheet products can be improved considerably by the addition of selected alloying elements, in particular dedicated amounts of tin.

SUMMARY OF THE INVENTION

It is an object of the present invention to provide a brazing sheet product for use in a brazing operation, ideally a fluxless CAB brazing operation, and wherein the brazing sheet product has as compared to Ni-plated brazing sheet products an improved post-braze corrosion resistance when measured in a SWAAT-test in accordance with ASTM G-85.

It is a further object of the present invention to provide a method of manufacturing the brazing sheet product.

The invention relates to a brazing sheet product comprising a core metal sheet, on at least one side of the core sheet a clad layer of an aluminium brazing alloy comprising silicon in an amount in the range of 4 to 14% by weight, and further comprising on at least one outersurface of the clad layer a plated layer of iron-X alloy, whereby X is selected from one or more members of the group consisting of tin, zinc, manganese, and copper, and such that the clad layer and all layers exterior thereto form a metal filler for a brazing operation and having a composition with the proviso that the mol-ratio of Fe:X is in the range of 10:(0.3 to 6). The invention also relates to a method of manufacturing such a brazing product, and to a brazed assembly comprising at least one component made of this brazing product.

DETAILED DESCRIPTION OF THE PREFERRED EMBODIMENTS

In accordance with the invention in one aspect there is provided a brazing sheet product comprising a core metal sheet, on at least one side of the core sheet a clad layer of an aluminium brazing alloy comprising silicon in an amount in the range of 4 to 14% by weight, preferably in the range of 7 to 14%, and further comprising on at least one outersurface of the clad layer a plated layer of iron-X alloy, whereby X is selected from one or more members of the group consisting of tin, zinc, manganese, and copper, and such that the clad layer and all layers exterior thereto form a metal filler for a brazing operation and having a composition with the proviso that the mol-ratio of Fe:X is in the range of 10:(0.3 to 6), and preferably in the range of 10:(0.5 to <5).

The plated iron-X alloy has been found to initiate the exothermic reaction during brazing in the absence of a brazing flux material such as the known NOCOLOK flux. It is believed that an upper layer of only iron is sensitive to oxidation. The surface iron-oxides formed might adversely influence the brazing process and/or any forming operation of the brazing sheet product prior to brazing. It has been found that a plated Fe—X alloy layer forms a thin stable surface oxide film in air. Further oxidation in air takes essentially place only at temperatures above about 300° C., which is significantly above any storage or handling temperature prior to a brazing operation. The metal X is selected such that it assists in reducing the surface tension of the molten filler metal during a brazing operation. The metal X can improve also the post-braze corrosion performance of the brazing product, in particular when subjected to a SWAAT environment. In the brazing sheet product according to the invention, and in particular those having an AA3xxx-series core alloy, post-braze SWAAT corrosion lifetimes without perforations according to ASTM G-85 exceed 21 days, and in the best examples exceed 26 days, which is a significant improved over the prior art, including in comparison to conventional NOCOLOK brazing for products having the same aluminium core alloy. The best results have been achieved by plating an iron-tin alloy. The brazing sheet product can be fluxless brazed under controlled atmosphere conditions in the absence of a brazing flux material while achieving very good post-braze corrosion performance significantly enhancing the possibilities of application of the brazing sheet product.

For applying the plated Fe—X alloy several electrolytes can be used, such as for example pyrophosphate for plating an Fe—Sn alloy or Fe—Sn—Bi alloy.

In an embodiment of the brazing sheet product the layer comprising iron-X alloy is formed by an electrolytic plating method. However, other techniques such as plating, thermal dipping, thermal spraying, Chemical Vapour Deposition ("CVD") and Physical Vapour Deposition ("PVD") or other techniques for depositing of metals or metal alloys from a gas or vapour phase may be used.

The plated Fe—X alloy layer has a thickness of at most 1.8 µm, preferably at most 1.0 µm. A coating thickness of more than 1.8 µm requires a prolonged treatment time for plating, and may result in wrinkling of the molten filler metal during a subsequent brazing operation. A preferred minimum thickness for this iron-X layer is about 0.03 µm, and more preferably 0.10 µm.

In an embodiment of the brazing sheet product there is a layer comprising iron or iron alloy between the outersurface of the clad layer and the plated layer of iron-X alloy, the layer comprising iron or iron alloy is preferably formed by an electrolytic plating method. Preferably the layer comprises 80 weight % or more of iron, more preferably 85 weight % or more of iron, still more preferably 90 weight % or more of iron, and most preferably of 96 weight % or more of iron or 98 weight % or more of iron. The applied iron or iron alloy layer is to ensure that there is sufficient unalloyed iron left in the filler metal to initiate the presumed exothermic reaction during the brazing cycle. The layer comprising iron or iron alloy may have a different composition compared to the iron-X alloy layer because the presence of metal X is not mandatory in the iron or iron alloy layer.

Also, to form the layer comprising iron or iron alloy, other techniques such as plating, thermal dipping, thermal spraying, CVD and PVD or other techniques for depositing of metals or metal alloys from a gas or vapour phase may be used. The applied layer of iron or iron alloy, e.g. Fe or Fe—Bi, having 80 weight % or more of iron, more preferably 85 weight % or more of iron, still more preferably 90 weight % or more of iron, and most preferably of 96 weight % or more of iron or 98 weight % or more of iron, has a thickness of at most 2.0 µm, preferably at most 1.0 µm, and more preferably in the range of 0.05 to 0.5 µm. A coating thickness of more than 2.0 µm requires a prolonged treatment time for plating, and may result in wrinkling of the molten filler metal during a subsequent brazing operation. A preferred minimum thickness for this iron or iron alloy layer is about 0.10 µm.

Preferably each of the applied layers, e.g. the iron or iron alloy layer and the plated iron-X layer, are essentially lead-free from an environmental point of view.

In an embodiment each of the applied layers, viz. the optional iron or iron alloy layer and plated iron-X layer are essentially nickel-free. In addition, the presence of nickel may have a detrimental influence of the post-braze corrosion performance of the brazing product. Another advantage is that iron salts used for the plating bath as compared to nickel salts are relatively inexpensive and are non-toxic.

In an embodiment the brazing sheet product according to the invention is further characterised by an optional thin layer, preferably comprising zinc or tin, as an intermediate bonding layer between the outersurface of the AlSi-alloy clad layer and the thin layer comprising iron or iron alloy or between the outersurface of the AlSi-alloy clad layer and the plated layer of iron-X alloy. With the intermediate bonding layer, more preferably of zinc, a very effective bond between the AlSi-alloy clad layer and the thin layer comprising iron or iron alloy is formed, the bond remaining effective during subsequent deformation of the brazing product, for example in a bending operation. Preferably the intermediate bonding layer has a thickness of at most 0.5 µm, more preferably at most 0.3 µm, and most preferably in the range of 0.01 to 0.15 µm. In the best results obtained a thickness of about 20 to 30 nm has been used. It has been found that the thin bonding layer has no detrimental effect on the post-braze corrosion performance of the brazing product according to the invention.

To form the intermediate bonding layer, techniques such as plating, electroplating, thermal dipping, thermal spraying, CVD and PVD or other techniques for depositing of metals or metal alloys from a gas or vapour phase may be used.

The core metal sheet can be of steel, aluminised steel, stainless steel, plated or coated stainless steel, bronze, brass, nickel, nickel alloy, titanium, or plated or coated titanium.

In an embodiment of the brazing sheet product the core sheet is an aluminium alloy, and is preferably selected from the group consisting of AA3xxx, AA5xxx, and AA6xxx-series aluminium alloy.

In an embodiment each AlSi-alloy clad layer has a thickness ranging from about 2 to 20% of the total thickness of the total brazing sheet product thickness. Typical aluminium clad layer thickness is in the range of 40 to 80 micron. The aluminium core sheet has a thickness typically in a range of at most 5 mm, more preferably in the range of 0.1 to 2 mm.

In an embodiment taken together the AlSi-alloy clad layer and all layers exterior thereto form a filler metal for a brazing operation and together has a composition comprising at least, by weight percent:

Si in the range of 5 to 14%,
Fe in the range of 0.15 to 8%,
X in the range of 0.01 to 7%, and whereby X is selected from one or more members of the group consisting of Sn, Zn, Mn, and Cu,
Sn in the range of 0.0 to 0.3% if not present as X,
Zn in the range of 0.0 to 0.3% if not present as X,
Mn in the range of 0.0 to 0.3% if not present as X,
Cu in the range of 0.0 to 0.3% if not present as X,
optionally one or more of Bi, Sb, In, and Pb (preferably the sum of Bi, Sb, In and Pb is not more than 0.4%), and whereby:
Bi in the range of 0.0 to 0.3%,
Sb in the range of 0.0 to 0.3%,
In in the range of 0.0 to 0.3%,
Pb in the range of 0.0 to 0.3%.
Ti in the range of 0.0 to 0.1%,
Sr in the range of 0.0 to 0.1%,
Mg in the range of 0.0 to 5%,
balance aluminium and inevitable impurities,
and with the proviso that the mol-ratio of Fe:X is in the range of 10:(0.3 to 6), and preferably in the range of 10:(0.5 to <5).

When the mol-ratio of Fe:X is too low no significant improvement in the post-braze corrosion life may be found. It has been found that if the mol-ratio becomes too high, then the brazeability becomes less efficient. From an environmental point of view the use of lead in the filler metal is preferably avoided.

In accordance with the invention in another aspect there is provided a method of manufacturing of a brazing sheet, which method comprises the steps of (a) providing a brazing sheet product having a core metal sheet, on at least one side of the core sheet a clad layer of an aluminium brazing alloy comprising silicon in an amount in the range of 4 to 14% by weight, (b) pretreating of the outersurface of the clad alloy, and (c) plating a metal layer onto the outersurface of the pretreated outersurface of the clad alloy, the metal layer comprising an iron-X alloy, whereby X is selected from one or more members of the group consisting of tin, zinc, manganese, and copper.

According to this aspect of the invention there is provided a method of manufacturing an iron-alloy plated brazing sheet product, such as an iron-tin alloy, the plated iron-alloy layer improving the post-braze corrosion performance as measured in a SWAAT-test of the resultant product as compared to product having a similar core and clad layer but instead having a plated nickel or nickel-alloy layer. The post-braze corrosion performance as measured in a SWAAT test is also better in comparison to conventional NOCOLOK brazing for products having the same aluminium core alloy and clad alloy devoid of any applied iron or nickel layer.

In the embodiment where the metal X is tin, it has been found that an upper layer of pure tin metal is sensitive to progressive oxidation in pre-braze conditions, in particular under humid conditions. The surface oxides formed might adversely influence the brazing process. By providing the tin in the form of a plated iron-tin layer essentially no free tin is available anymore and thereby is avoided the occurrence of the detrimental progressive oxidation of the tin. It has been found that a plated Fe—Sn alloy layer forms a thin stable surface oxide film in air. Further oxidation in air takes essentially place only at temperatures above about 320° C.

The adhesion of the iron or iron alloy or iron-X alloy layer to the cladding of a brazing sheet product is fairly good, but may be further improved by a proper pretreatment of the outersurface of the clad brazing layer on which the iron or iron alloy or iron-X alloy layer is being deposited. The pre-treatment comprises a preliminary cleaning step during which the surface is made free from grease, oil, or buffing compounds. This can be accomplished in various ways, and can be done amongst other ways by vapour degreasing, solvent washing, or solvent emulsion cleaning. Also, a mild etching may be employed. Following the preliminary cleaning, the surface should preferably be conditioned. Several methods can be applied successfully, such as, those set out in the international application WO-01/88226 of J. N. Mooij et al., on page 9, line 29 to page 10, line 21. Another useful method is set out in the international application WO-02/086197 of J. N. Mooij et al., on page 1, lime 22 to page 5, line 23.

In an embodiment the method according to the invention is further characterised by a pre-treatment of depositing a thin layer, preferably comprising zinc or tin, as an intermediate bonding layer between the outersurface of the AlSi-alloy layer and the layer comprising iron or iron alloy or iron-X alloy. With this intermediate bonding layer a very effective bond between the AlSi-alloy layer and the thin layer comprising iron or iron alloy is formed, the bond remaining effective during subsequent deformation of the brazing sheet product, for example in a bending operation. The most suitable methods of applying such an intermediate layer of zinc is by means of direct or immersion plating. Preferably the applied intermediate bonding layer has a thickness of at most 0.5 μm, more preferably at most 0.3 μm, and most preferably in the range of 0.01 to 0.15 μm. In the best results obtained a thickness of about 30 nm has been used. A coating thickness of more than 0.5 μm is thought to have no further advantages for improving the adhesion.

The invention further relates to the use of an iron-tin plating bath for the deposition of a layer comprising iron and tin on a brazing sheet product for use in a brazing operation, in particular a fluxless CAB operation. Several Fe—Sn alloy baths can be used, e.g. pyrophosphate electrolytes operating at pH in the range of 8 to 11, preferably 8 to 9. Others are for example Fe—Sn or Sn—Fe alloys from chloride-sulfate baths.

The invention further provides an assembly of components, for example a heat exchanger, typically for automotive applications, or a fuel cell, typically an electrochemical fuel cell, joined by brazing, whereby at least one of the components being a brazing sheet product as set out above or the brazing product obtained by the method set out above. The brazing operation is preferably carried out in an inert atmosphere (CAB) in the absence of a brazing flux material or under a vacuum.

In an embodiment there is provided a brazed assembly wherein at least one of the components to be joined by brazing is made of the brazing sheet product set out above or produced by the method in accordance with the invention described above, and at least one other component is made of steel, aluminised steel, stainless steel, plated or coated stainless steel, bronze, brass, nickel, nickel alloy, titanium, or plated or coated titanium.

Having now fully described the invention, it will be apparent to one of ordinary skill in the art that many changes and modifications can be made without departing from the spirit or scope of the invention as hereon described.

The invention claimed is:

1. A brazing sheet product comprising a core metal sheet, on at least one side of said core sheet a clad layer of an aluminium brazing alloy comprising silicon in an amount in the range of 4 to 14% by weight, and further comprising on at least one outer surface of said clad layer a coated layer of iron-X alloy, wherein X is selected from one or more members of the group consisting of tin, zinc, manganese, and copper, and such that the clad layer and all layers exterior thereto form a metal filler for a brazing operation and having a composition with the proviso that the mol-ratio of Fe:X is in the range of 10:(0.3 to 6).

2. The brazing sheet product according to claim 1, wherein the mol-ratio of Fe:X is in the range of 10:(0.5 to >5).

3. The brazing sheet product according to claim 1, wherein the layer comprising iron-X alloy is formed by a plating method.

4. The brazing sheet product according to claim 1, wherein the layer comprising iron-X alloy is formed by an electrolytic plating method.

5. The brazing sheet product according to claim 1, wherein the layer comprising iron-X alloy is formed by a PVD method.

6. The brazing sheet product according to claim 1, wherein the layer comprising iron-X alloy is formed by a thermal spraying method.

7. The brazing sheet product according to claim 1, wherein the layer comprising iron-X alloy has a thickness of at most 1.8 μm.

8. The brazing sheet product according to claim 1, wherein the layer comprising iron-X alloy has a thickness of at most 1.0 μm.

9. The brazing sheet product according to claim 1, wherein the layer comprising iron-X alloy has a thickness of about 0.03 to 1.8 μm.

10. The brazing sheet product according to claim 1, wherein the layer comprising iron-X alloy has a thickness of about 0.10 to 1.0 μm.

11. The brazing sheet product according to claim 1, wherein there is a layer comprising iron or iron alloy between the outer surface of said clad layer and the layer of iron-X alloy.

12. The brazing sheet product according to claim 1, wherein there is a layer comprising iron or iron alloy, between the outer surface of said clad layer and the layer of iron-X alloy, formed by an electrolytic plating method.

13. The brazing sheet product according to claim 11, wherein the layer comprising iron or iron alloy comprises at least 80 weight percent iron.

14. The brazing sheet product according to claim 11, wherein the layer comprising iron or iron alloy comprises at least 85 weight percent iron.

15. The brazing sheet product according to claim 11, wherein the layer comprising iron or iron alloy comprises at least 90 weight percent iron.

16. The brazing sheet product according to claim 11, wherein the layer comprising iron or iron alloy comprises at least 96 weight percent iron.

17. The brazing sheet product according to claim 11, wherein the layer comprising iron or iron alloy comprises at least 98 weight percent iron.

18. The brazing sheet product according to claim 11, wherein the layer comprising iron or iron alloy has a thickness of at most 2.0 μm.

19. The brazing sheet product according to claim 11, wherein the layer comprising iron or iron alloy has a thickness of at most 1.0 μm.

20. The brazing sheet product according to claim 11, wherein the layer comprising iron or iron alloy has a thickness in the range of about 0.1 to 2.0 μm.

21. The brazing sheet product according to claim 11, wherein the layer comprising iron or iron alloy has a thickness in the range of 0.05 to 0.5 μm.

22. The brazing sheet product according to claim 1, wherein there is a bonding layer between said outer surface of said clad layer and said layer comprising iron or iron alloy.

23. The brazing sheet product according to claim 1, wherein there is a bonding layer comprising zinc or tin between said outer surface of said clad layer and said layer comprising iron or iron alloy.

24. The brazing sheet product according to claim 22, wherein said bonding layer has a thickness in the range of at most 1.0 μm.

25. The brazing sheet product according to claim 22, wherein said bonding layer has a thickness of at most 0.5 micron.

26. The brazing sheet product according to claim 22, wherein said bonding layer has a thickness of at most 0.3 μm.

27. The brazing sheet product according to claim 22, wherein said bonding layer has a thickness in the range of 0.01 to 0.15 μm.

28. The brazing sheet product according to claim 22, wherein said iron-X layer is substantially lead free.

29. The brazing sheet product according to claim 11, wherein the layer comprising iron or iron alloy is substantially lead free.

30. The brazing sheet product according to claim 1, wherein the core metal sheet comprises an member selected from the group consisting of steel, aluminised steel, stainless steel, plated or coated stainless steel, bronze, brass, nickel, nickel alloy, titanium, or plated or coated titanium.

31. The brazing sheet product according to claim 1, wherein the core metal sheet comprises an aluminium alloy.

32. The brazing sheet product according to claim 1, wherein the core metal sheet comprises an aluminium alloy selected from the group consisting of AA3xxx, AA5xxx, and AA6xxx-series aluminium alloy.

33. The brazing sheet product according to claim 1, wherein taken together the clad layer comprising silicon in an amount in the range of 4 to 14% by weight and all layers exterior thereto form a filler metal for a brazing operation and having a composition comprising at least, by weight percent:
   Si in the range of 5 to 14%,
   Fe in the range of 0.15 to 8%,
   X in the range of 0.01 to 7%, and wherein X is selected from one or more members of the group consisting of Sn, Zn, Mn, and Cu.
   Sn in the range of 0.0 to 0.3% if not present as X,
   Zn in the range of 0.0 to 0.3% if not present as X,
   Mn in the range of 0.0 to 0.3% if not present as X,
   Cu in the range of 0.0 to 0.3% if not present as X,
   optionally one or more of Bi, Sb, In and Pb, wherein:
      Bi in the range of 0.0 to 0.3%,
      Sb in the range of 0.0 to 0.3%,
      In in the range of 0.0 to 0.3%,
      Pb in the range of 0.0 to 0.3%,
   Ti in the range of 0.0 to 0.1%,
   Sr in the range of 0.0 to 0.1%,
   Mg in the range of 0.0 to 5%,
   balance aluminium and inevitable impurities,
   and with the proviso that the mol-ratio of Fe:X is in the range of 10:(0.3 to 6).

34. A method of manufacturing a brazing sheet product according to claim 1, comprising the steps of: (a) providing a brazing sheet product having a core metal sheet, on at least one side of said core sheet a clad layer of an aluminium brazing alloy comprising silicon in an amount in the range of 4 to 14% by weight, (b) pretreating of the outer surface of the clad alloy, and (c) coating a metal layer onto the outer surface of the pretreated outer surface of the clad alloy, said metal layer comprising an iron-X alloy, wherein X is selected from one or more members of the group consisting of tin, zinc, manganese, and copper.

35. The method according to claim 34, wherein during step (b) the outer surface of the clad layer is pre-treated by applying a bonding layer.

36. The method according to claim 34, wherein during step (b) the outer surface of the clad layer is pre-treated by applying a bonding layer comprising zinc or tin.

37. The method according to claim 35, wherein after applying said bonding layer and before applying the metal layer comprising an iron-X alloy, there is applied a layer comprising more than 85% by weight of iron.

38. The method according to claim 34, wherein the metal layer is coated onto the outer surface of the pretreated outer surface of the clad alloy by plating.

39. The method according to claim 34, wherein the metal layer is coated onto the outer surface of the pretreated outer surface of the clad alloy by PVD.

40. The method according to claim 34, wherein the metal layer is coated onto the outer surface of the pretreated outer surface of the clad alloy by thermal spraying.

41. The method according to claim 34, wherein the iron X layer is substantially lead-free.

42. The method according to claim 34, wherein the layer comprising iron or iron alloy is substantially lead-free.

43. The method according to claim 34, wherein the layer comprising iron or iron alloy comprises at least 80 weight percent iron.

44. The method according to claim 34, wherein the layer comprising iron or iron alloy comprises at least 85 weight percent iron.

45. The method according to claim 34, wherein the layer comprising iron or iron alloy comprises at least 90 weight percent iron.

46. The method according to claim 34, wherein the layer comprising iron or iron alloy comprises at least 96 weight percent iron.

47. The method according to claim 34, wherein the layer comprising iron or iron alloy comprises at least 98 weight percent iron.

48. An assembly of components joined by brazing, at least one said components being a brazing sheet product according to claim 1.

49. The assembly according to claim 48, wherein said at least one component is joined by brazing to at least one other component made of a material selected from the group consisting of steel, aluminised steel, stainless steel, plated or coated stainless steel, bronze, brass, nickel, nickel alloy, titanium, and plated or coated titanium.

50. The assembly according to claim 48, wherein the assembly is a heat exchanger.

51. The assembly according to claim 48, wherein the assembly is a fuel cell.

52. The assembly according to claim 48, wherein the assembly is an electrochemical fuel cell.

53. The assembly according to claim 48, wherein the assembly is brazed under a vacuum or in an inert atmosphere in the absence of a brazing-flux material.

54. An assembly of components joined by brazing, at least one said components being a brazing sheet product obtained by the method according to claim 34.

55. The assembly according to claim 54, wherein the assembly is brazed under a vacuum or in an inert atmosphere in the absence of a brazing-flux material.

56. The method according to claim 35, wherein after applying said bonding layer and before applying the metal layer comprising an iron-X alloy, there is applied by plating a layer comprising more than 85% by weight of iron.

* * * * *